(12) United States Patent
Robison

(10) Patent No.: US 7,025,545 B1
(45) Date of Patent: Apr. 11, 2006

(54) ADJUSTABLE TIRE TIE-DOWN APPARATUS

(76) Inventor: Jay Robison, 3847 S. Tanager La., Billings, MT (US) 59102

( * ) Notice: Subject to any disclaimer, the term of this patent is extended or adjusted under 35 U.S.C. 154(b) by 0 days.

(21) Appl. No.: 11/081,924

(22) Filed: Mar. 17, 2005

(51) Int. Cl.
B60P 7/08 (2006.01)

(52) U.S. Cl. .............................. 410/20; 410/10; 410/19

(58) Field of Classification Search ................. 410/9, 410/10, 12, 19, 20–21, 23; 24/265 CD, 68 CD; 248/499
See application file for complete search history.

(56) References Cited

U.S. PATENT DOCUMENTS

| | | |
|---|---|---|
| 4,479,746 A | 10/1984 | Huber |
| 4,611,961 A | 9/1986 | Van Iperen et al. |
| 4,786,223 A | 11/1988 | Crissy et al. |
| 4,960,353 A | 10/1990 | Thorndyke |
| 4,993,898 A | 2/1991 | Klahold |
| 5,330,148 A | 7/1994 | Floyd |
| 5,458,447 A | 10/1995 | Clason |
| 5,584,622 A | 12/1996 | Dickerson, Sr. |
| 5,941,665 A | 8/1999 | Dahlin |
| 6,139,231 A | 10/2000 | Kissel |
| 6,171,037 B1 * | 1/2001 | Andre ........................ 410/20 |
| 6,328,511 B1 * | 12/2001 | Cardona ..................... 410/12 |
| 6,637,077 B1 | 10/2003 | Doty |

* cited by examiner

Primary Examiner—Stephen Gordon

(57) ABSTRACT

A tie-down apparatus includes a plurality of O-rings and a plurality of fasteners laterally situated from the O-rings such that the fasteners become disposed at opposite ends of the apparatus. The apparatus further includes a plurality of central straps having a fixed length and oppositely registered looped end portions. The central straps are permanently conjoined to the O-rings and slidably adjustable about a circumference of the O-rings. The present invention further includes a first strap having oppositely registered looped end portions and a second strap having opposed end portions. A mechanism for adjusting a length of the second strap is also included. The adjusting mechanism includes a ratcheting come-a-long and a third strap having oppositely registered looped end portions. A plurality of anchoring brackets are fastened to the flat bed of the pick-up truck and are permanently secured to selected regions of the flat bed of the pick-up truck.

18 Claims, 3 Drawing Sheets

ADJUSTABLE TIRE TIE-DOWN APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to tie-down systems and, more particularly, to an adjustable tire tie-down apparatus for ATV tires so that ATVs can be safely transported in the bed of a pick-up truck.

2. Prior Art

A common recreational activity utilizes a four-wheeled cycle, known as an ATV (All Terrain Vehicle) in off road terrain. It is normally desirable to be able to transport this type of vehicle to different off-road locations. Typical transportation for such an off-road vehicle is a pickup truck. Unfortunately, the bed of a pickup truck is adherently limited in size. It is quite common that it is desirable to transport two or more off-road vehicles to a particular off-road location. The typical size of the bed of a pickup truck can only accommodate a maximum of two of the off-road vehicles when the vehicle is merely set within the bed of the truck.

Many devices are known for tying down a motorcycle or ATV for transporting on a trailer or truck. Such references discuss a variety of utility trailers, stabilizing hitches, racks, hand grip mounts, strapping systems and suspension wear reducers for towing or carrying a motorcycle or ATV. To transport motorcycles or ATV's, tie down straps are typically used to secure the transported vehicle in the bed of a truck, box van, trailer or other transporting vehicle.

Tie-down straps typically consist of a pair of nylon straps and are normally interconnected by a tensioning device, such as a clamp or ratcheting assembly. In use, the typical practice is to place one hook on the motorcycle or ATV steering handle bar, and attach the other hook to an eyelet or other attachment point on the transporting vehicle—at an approximate angle of 45 degrees. This method is repeated using a second tie-down strap on the opposite side of the motorcycle or ATV. When tension is applied to both tie-down straps, the vehicle's front suspension is compressed, creating retaining force against the surface of the transporting vehicle. This spring-like tension holds the motorcycle or ATV securely in place for transport.

Unfortunately, such tension may also cause damage to the motorcycle or ATV, particularly if the road is bumpy or littered with potholes increasing the stress put on such straps.

Accordingly, a need remains for a restraint device and system for ATV's that provides reliable security without causing damage to the ATV. The present invention satisfies such a need by providing an adjustable tire tie-down that is used to secure the tire of an ATV to the bed of a pick-up truck. Such an apparatus conveniently accommodates tires of different sizes, increasing its versatility and appeal to consumers. The adjustable feature of the tie-down apparatus ensures that the object being transported is safely secured, putting the owner's mind at ease and reducing the possibility of damage to either the truck or the object.

BRIEF SUMMARY OF THE INVENTION

In view of the foregoing background, it is therefore an object of the present invention to provide an apparatus for adjustably securing an ATV tire to a flat bed of a pick-up truck. These and other objects, features, and advantages of the invention are provided by an apparatus including a plurality of coextensive O-rings spaced along a longitudinal length of the apparatus. A plurality of fasteners are oppositely registered along the longitudinal length of the apparatus and laterally situated from the O-rings such that the fasteners become disposed at opposite ends of the apparatus.

The present invention further includes a plurality of central straps having a fixed length and oppositely registered looped end portions. Each of the looped end portions defines a passageway for receiving at least a portion of the O-rings therethrough respectively. The central straps are permanently conjoined to the O-rings and slidably adjustable about a circumference of the O-rings for assisting a user to position the central straps about an outer surface of an ATV tire. The longitudinal lengths of the central straps are smaller than a diameter of the ATV tire.

The present invention further includes a first strap having oppositely registered looped end portions. One of the end portions of the first strap defines a passageway for receiving at least a portion of one O-ring and is permanently conjoined thereto. Another looped end portion of the first strap defines a passageway for removably receiving one of the fasteners therethrough.

The present invention further includes a second strap having opposed end portions. One of the end portions of the second strap is permanently conjoined to one of the O-rings. The second strap and the first strap are axially registered and medially alignable with the central straps.

One of the end portions of each of the central straps and one of the end portions of the first strap are conjoined to one of the O-rings respectively. Another end portion of the central straps and another end portion of the second strap are connected to another of the O-rings respectively. The central straps are coextensive such that the user can symmetrically orient the device along inner and outer faces of the ATV tire with the central straps being centrally aligned along an outer surface of the ATV tire.

The present invention further includes a mechanism for adjusting a longitudinal length of the second strap and for assisting a user to secure an ATV tire to the flat bed of the pick-up truck. A plurality of anchoring brackets are fastened to the flat bed of the pick-up truck and are permanently secured to selected regions of the flat bed of the pick-up truck and arranged in such a manner that at least one ATV tire becomes medially nested between a pair of the brackets so that the bracket pair becomes centrally registered forward and rearward of the ATV tire. Each of the brackets has a monolithically formed D-shaped portion extending vertically therefrom for receiving a hook therethrough. Each of the anchoring brackets includes a non-planar top member having a monolithically formed central region defining a passageway through which the hook is positional.

The adjusting mechanism includes a ratcheting come-a-long and a third strap having oppositely registered looped end portions. One of the end portions of the third strap is connected to the come-a-long and another of the end portions of the third strap defines a passageway for removably receiving another fastener therethrough. The come-a-long includes a spool for receiving another end portion of the second strap when a user selectively adjusts the longitudinal length of the second strap. The first strap and the second strap and the third strap are formed from flexible, non-stretchable material.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
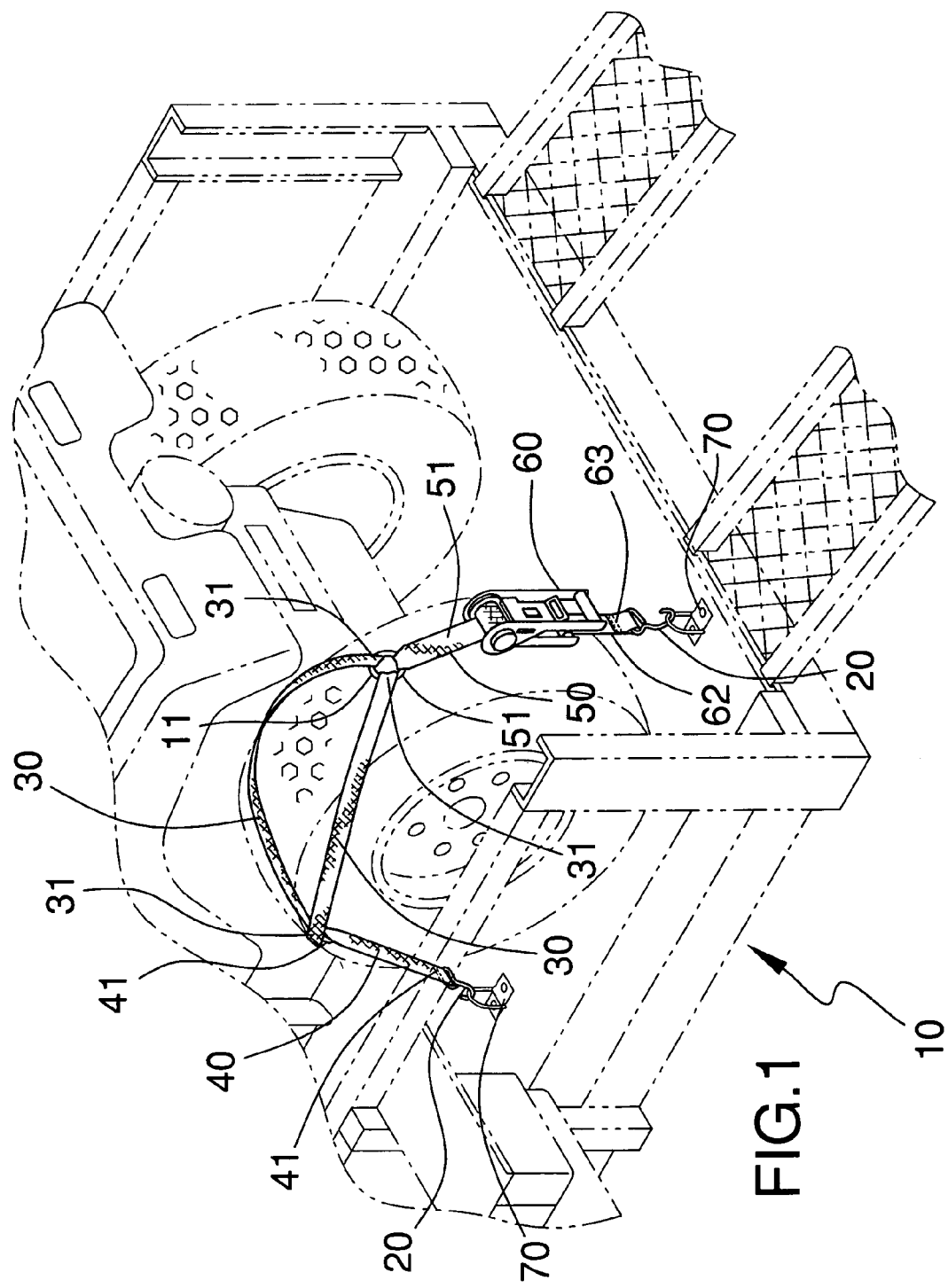
FIG. 1 is a perspective view showing an adjustable tire tie-down apparatus in a preferred environment, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide an adjustable tire tie-down apparatus. It should be understood that the apparatus 10 may be used to tie down and secure many different types of objects and should not be limited for use with only ATV tires.

Figure 2:
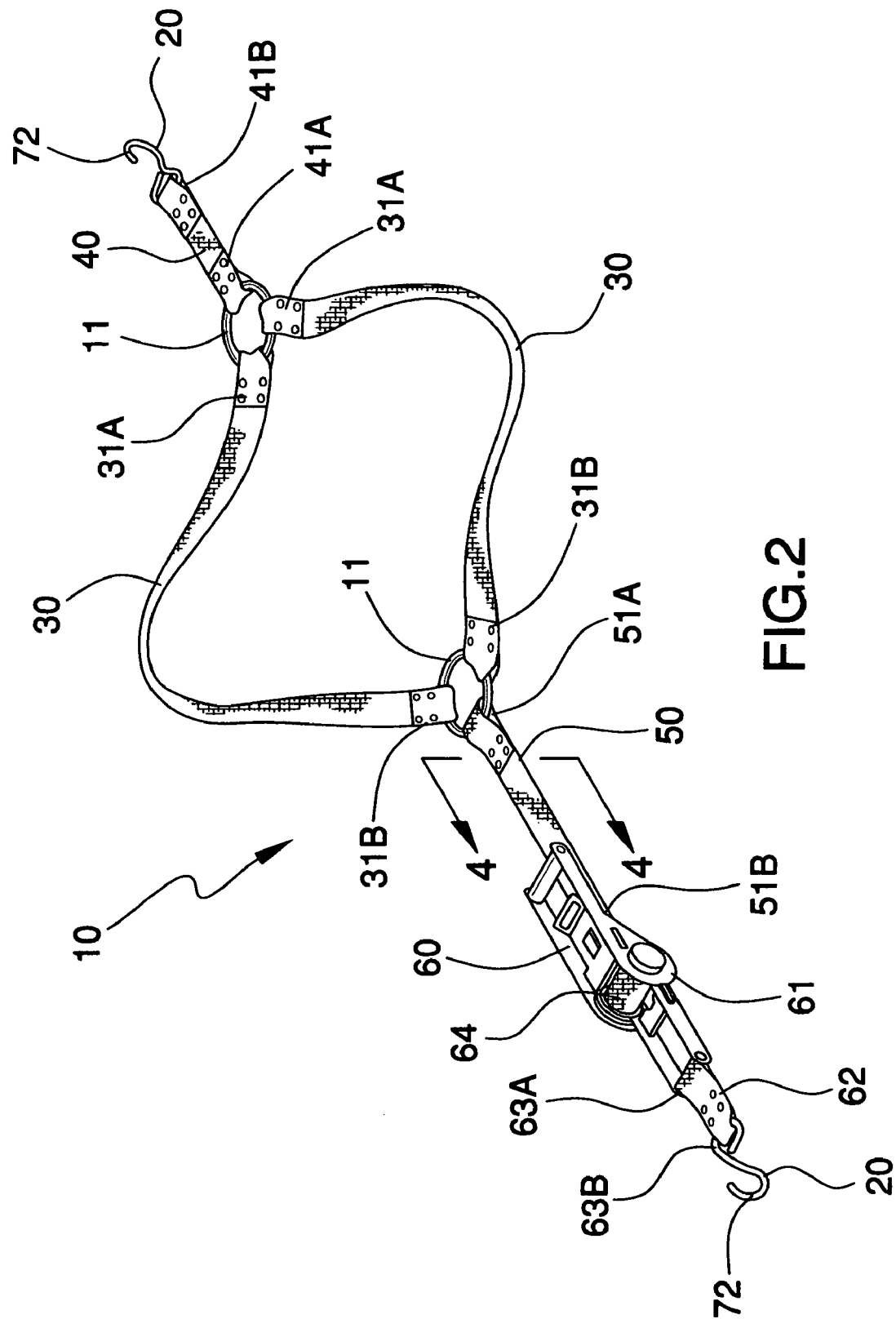
FIG. 2 is a perspective view of the apparatus shown in FIG. 1.

Referring initially to FIGS. 1 and 2, the apparatus 10 includes a plurality of coextensive O-rings 11 spaced along a longitudinal length of the apparatus 10. A plurality of fasteners 20 are oppositely registered along the longitudinal length of the apparatus 10 and laterally situated from the O-rings 11 such that the fasteners 20 become disposed at opposite ends of the apparatus 10. Such fasteners 20 advantageously enable a user to quickly and easily detach the apparatus 10 for unloading. The apparatus 10 further includes a plurality of central straps 30 having a fixed length and oppositely registered looped end portions 31. Such straps are formed from flexible material and are preferably nylon, although other suitable materials may be used, as is obvious to one having ordinary skill in the art.

Each of the looped end portions 31 defines a passageway for receiving at least a portion of the O-rings 11 therethrough respectively and includes a plurality of rivets 12. Such rivets 12 are preferably formed from galvanized metal or stainless steel, to resist corrosion in an outdoor environment. The central straps 30 are permanently conjoined to the O-rings 11 and are slidably adjustable about a circumference of the O-rings 11 for assisting a user to position the central straps 30 about an outer surface of an ATV tire. Being slidably adjustable, the central straps 30 may accommodate tires of varying size, thereby increasing the versatility and usefulness of the apparatus 10. The longitudinal lengths of the central straps 30 are smaller than a diameter of the ATV tire. Such central straps 30 are critical to maintaining the tire of an ATV at a substantially stable position during transportation thereof.

Still referring to FIGS. 1 and 2, the apparatus 10 further includes a first strap 40 having oppositely registered looped end portions 41. One of the end portions 41A of the first strap 40 defines a passageway for receiving at least a portion of one O-ring 11 and is permanently conjoined thereto. Another looped end portion 41B of the first strap 40 defines a passageway for removably receiving one of the fasteners 20 therethrough. Each looped end portions 41 includes a plurality of rivets 12. Such a strap 40 is preferably positioned forward of an ATV tire, as shown in FIG. 1, but may be positioned rearward of such tire.

Figure 4:
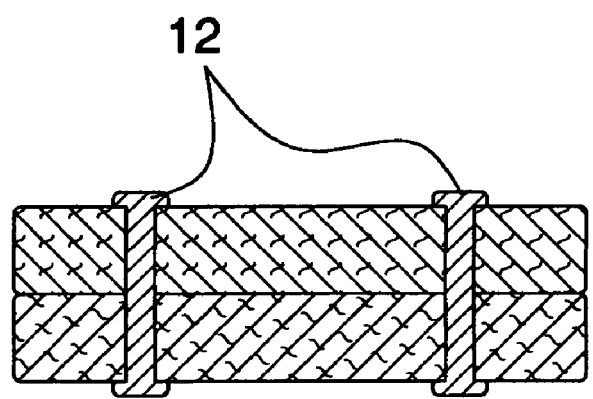
FIG. 4 is a cross-sectional view of the adjustable strap, taken along line 4—4.

The apparatus 10 further includes a second strap 50 having opposed end portions 51. One of the end portions 51A of the second strap 50 is permanently conjoined to one of the O-rings 11, as shown in FIG. 4. The one end portion 51A includes a plurality of rivets 12. The second strap 50 and the first strap 40 are axially registered and medially alignable with the central straps 30 so that the apparatus 10 maintains an ATV tire at a fixed position during transport. Such a strap 50 is preferably positioned rearward of an ATV tire, as shown in FIG. 1, but may be positioned forward of such tire if operating conditions require such alignment.

Still referring to FIGS. 1 and 2, one of the end portions 31A of each of the central straps 30 and one of the end portions 41B of the first strap are conjoined to one of the O-rings 11 respectively. Another end portion 31B of the central straps 30 and another end portion 51A of the second strap 50 are connected to another of the O-rings 11 respectively. The central straps 30 are coextensive such that the user can symmetrically orient the device along inner and outer faces of the ATV tire with the central straps 30 being centrally aligned along an outer surface of the ATV tire, thus providing safety and security to the transportation of ATVs.

Figure 3:
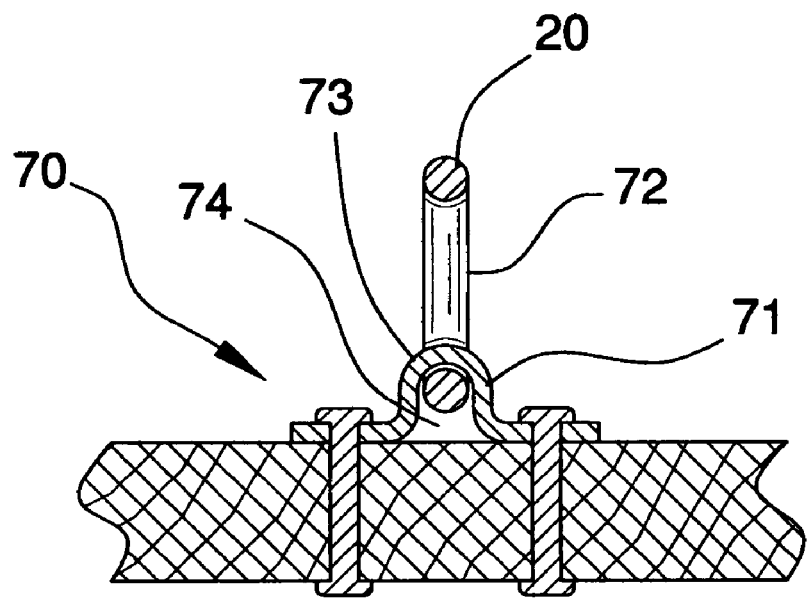
FIG. 3 is a cross-sectional view of the anchoring bracket.

Referring to FIGS. 1 and 3, the apparatus 10 further includes a mechanism 60 for adjusting a longitudinal length of the second strap 50 and for assisting a user to secure an ATV tire to the flat bed of the pick-up truck. A plurality of anchoring brackets 70 are fastened to the flat bed of the pick-up truck and are permanently secured to selected regions of the flat bed of the pick-up truck and arranged in such a manner that at least one ATV tire becomes medially nested between a pair of the brackets 70 so that the bracket pair 70 becomes centrally registered forward and rearward of the ATV tire. Each of the brackets 70 has a monolithically formed D-shaped portion 71 extending vertically therefrom for receiving a hook 72 therethrough. Each of the anchoring brackets 70 includes a non-planar top member 73 having a monolithically formed central region 74 defining a passageway through which the hook 72 is positional, as shown in FIG. 3.

Referring again to FIGS. 1 and 2, the adjusting mechanism 60 includes a ratcheting come-a-long 61, as well known in the industry, and a third strap 62 having oppositely registered looped end portions 63. One of the end portions 63A of the third strap 62 is connected to the come-a-long 61 and another of the end portions 63B of the third strap 62 define a passageway for removably receiving another fastener 20 therethrough. The one end portion 63B includes a plurality of rivets 12. The come-a-long 61 includes a spool 64 for receiving another end portion 51B of the second strap 50 when a user selectively adjusts the longitudinal length of the second strap 50.

The come-a-long 61 conveniently enables a user of nearly any size and strength to manually adjust the length of the second strap 50, thereby tightening the grip of the apparatus 10 on an ATV tire. The first strap 40 and the second strap 50 and the third strap 62 are formed from flexible, non-stretchable material, such as nylon, but may also be formed from other durable non-stretchable material such as wire or steel braid, as well known in the industry.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for adjustably securing an ATV tire to a flat bed of a pick-up truck, said apparatus comprising:
   a plurality of coextensive O-rings spaced along a longitudinal length of said apparatus;
   a plurality of fasteners oppositely registered along the longitudinal length of said apparatus and laterally situated from said O-rings such that said fasteners become disposed at opposite ends of said apparatus;
   a plurality of central straps having oppositely registered looped end portions, each of said looped end portions defining a passageway for receiving at least a portion of said O-rings therethrough respectively, said central straps being permanently conjoined to said O-rings and slidably adjustable about a circumference of said O-rings for assisting a user to position said central straps about an outer surface of an ATV tire;
   a first strap having oppositely registered looped end portions, one of said end portions of said first strap defining a passageway for receiving at least a portion of one of said O-rings and being permanently conjoined thereto, another one of said looped end portions of said first strap defining a passageway for removably receiving one of said fasteners therethrough;
   a second strap having opposed end portions, one of said end portions of said second strap being permanently conjoined to one of said O-rings, said second strap and said first strap being axially registered and medially alignable with one of said central straps;
   means for adjusting a longitudinal length of said second strap for assisting a user to secure an ATV tire to the flat bed of the pick-up truck; and
   a plurality of anchoring brackets fastened to the flat bed of the pick-up truck, said brackets being permanently secured to selected regions of the flat bed of the pick-up truck and arranged in such a manner that at least one ATV tire becomes medially nested between a pair of said brackets so that said bracket pair becomes centrally registered forward and rearward of the at least one ATV tire, each of said brackets having a monolithically formed D-shaped portion extending vertically therefrom for receiving a hook therethrough.

2. The apparatus of claim 1, wherein said adjusting means comprises;
   a ratcheting come-a-long; and
   a third strap having oppositely registered looped end portions, one of said end portions of said third strap being connected to said come-a-long, another of said end portions of said third strap defining a passageway for removably receiving another of said fasteners therethrough;
   wherein said come-a-long includes a spool for receiving another one of said end portions of said second strap when a user selectively adjusts the longitudinal length of said second strap.

3. The apparatus of claim 2, wherein said first strap and said second strap and said third strap are formed from flexible, non-stretchable material.

4. The apparatus of claim 1, wherein each of said central straps has a fixed length.

5. The apparatus of claim 1, wherein each of said anchoring brackets comprise: a non-planar top member having a monolithically formed central region defining a passageway through which said hook is positional.

6. The apparatus of claim 1, wherein said central straps are coextensive such that a user can symmetrically orient said apparatus along inner and outer faces of the at least one ATV tire with said central straps being centrally aligned along an outer surface of the at least one ATV tire.

7. An apparatus for adjustably securing an ATV tire to a flat bed of a pick-up truck, said apparatus comprising:
   a plurality of coextensive O-rings spaced along a longitudinal length of said apparatus;
   a plurality of fasteners oppositely registered along the longitudinal length of said apparatus and laterally situated from said O-rings such that said fasteners become disposed at opposite ends of said apparatus;
   a plurality of central straps having oppositely registered looped end portions, each of said looped end portions defining a passageway for receiving at least a portion of said O-rings therethrough respectively, said central straps being permanently conjoined to said O-rings and slidably adjustable about a circumference of said O-rings for assisting a user to position said central straps about an outer surface of an ATV tire;
   wherein longitudinal lengths of said central straps are smaller than a diameter of an ATV tire;
   a first strap having oppositely registered looped end portions, one of said end portions of said first strap defining a passageway for receiving at least a portion of one said O-ring and being permanently conjoined thereto, another one of said looped end portions of said first strap defining a passageway for removably receiving one of said fasteners therethrough;

a second strap having opposed end portions, one of said end portions of said second strap being permanently conjoined to one of said O-rings, said second strap and said first strap being axially registered and medially alignable with one of said central straps;

means for adjusting a longitudinal length of said second strap for assisting a user to secure an ATV tire to the flat bed of the pick-up truck; and a plurality of anchoring brackets fastened to the flat bed of the pick-up truck, said brackets being permanently secured to selected regions of the flat bed of the pick-up truck and arranged in such a manner that at least one ATV tire becomes medially nested between a pair of said brackets so that said bracket pair becomes centrally registered forward and rearward of the at least one ATV tire, each of said brackets having a monolithically formed D-shaped portion extending vertically therefrom for receiving a hook therethrough.

8. The apparatus of claim 7, wherein said adjusting means comprises;
   a ratcheting come-a-long; and
   a third strap having oppositely registered looped end portions, one of said end portions of said third strap being connected to said come-a-long, another of said end portions of said third strap defining a passageway for removably receiving another of said fasteners therethrough;
   wherein said come-a-long includes a spool for receiving another one of said end portions of said second strap when a user selectively adjusts the longitudinal length of said second strap.

9. The apparatus of claim 8, wherein said first strap and said second strap and said third strap are formed from flexible, non-stretchable material.

10. The apparatus of claim 7, wherein each of said central straps has a fixed length.

11. The apparatus of claim 7, wherein each of said anchoring brackets comprise: a non-planar top member having a monolithically formed central region defining a passageway through which said hook is positional.

12. The apparatus of claim 7, wherein said central straps are coextensive such that a user can symmetrically orient said apparatus along inner and outer faces of the at least one ATV tire with said central straps being centrally aligned along an outer surface of the at least one ATV tire.

13. An apparatus for adjustably securing an ATV tire to a flat bed of a pick-up truck, said apparatus comprising:
   a plurality of coextensive O-rings spaced along a longitudinal length of said apparatus;
   a plurality of fasteners oppositely registered along the longitudinal length of said apparatus and laterally situated from said O-rings such that said fasteners become disposed at opposite ends of said apparatus;
   a plurality of central straps having oppositely registered looped end portions, each of said looped end portions defining a passageway for receiving at least a portion of said O-rings therethrough respectively, said central straps being permanently conjoined to said O-rings and slidably adjustable about a circumference of said O-rings for assisting a user to position said central straps about an outer surface of an ATV tire;
   wherein longitudinal lengths of said central straps are smaller than a diameter of an ATV tire;
   a first strap having oppositely registered looped end portions, one of said end portions of said first strap defining a passageway for receiving at least a portion of one of said of O-rings and being permanently conjoined thereto, another one of said looped end portions of said first strap defining a passageway for removably receiving one of said fasteners therethrough;
   a second strap having opposed end portions, one of said end portions of said second strap being permanently conjoined to one of said O-rings, said second strap and said first strap being axially registered and medially alignable with one of said central straps;
   wherein one of said end portions of each said of central straps and one of said end portions of said first strap are conjoined to one of said O-rings respectively, another one of said end portions of said central straps and another one of said end portions of said second strap are connected to another one of said O-rings respectively;
   means for adjusting a longitudinal length of said second strap for assisting a user to secure an ATV tire to the flat bed of the pick-up truck; and
   a plurality of anchoring brackets fastened to the flat bed of the pick-up truck, said brackets being permanently secured to selected regions of the flat bed of the pick-up truck and arranged in such a manner that at least one ATV tire becomes medially nested between a pair of said brackets so that said bracket pair becomes centrally registered forward and rearward of the at least one ATV tire, each of said brackets having a monolithically formed D-shaped portion extending vertically therefrom for receiving a hook therethrough.

14. The apparatus of claim 13, wherein said adjusting means comprises;
   a ratcheting come-a-long; and
   a third strap having oppositely registered looped end portions, one of said end portions of said third strap being connected to said come-a-long, another of said end portions of said third strap defining a passageway for removably receiving another of said fasteners therethrough;
   wherein said come-a-long includes a spool for receiving another one of said end portions of said second strap when a user selectively adjusts the longitudinal length of said second strap.

15. The apparatus of claim 14, wherein said first strap and said second strap and said third strap are formed from flexible, non-stretchable material.

16. The apparatus of claim 13, wherein each of said central straps has a fixed length.

17. The apparatus of claim 13, wherein each of said anchoring brackets comprise: a non-planar top member having a monolithically formed central region defining a passageway through which said hook is positional.

18. The apparatus of claim 13, wherein said central straps are coextensive such that a user can symmetrically orient said apparatus along inner and outer faces of the at least one ATV tire with said central straps being centrally aligned along an outer surface of the at least one ATV tire.

* * * * *